US012017446B2

(12) United States Patent
Tanaka et al.

(10) Patent No.: US 12,017,446 B2
(45) Date of Patent: Jun. 25, 2024

(54) IMAGE RECORDING APPARATUS

(71) Applicant: BROTHER KOGYO KABUSHIKI KAISHA, Nagoya (JP)

(72) Inventors: Mitsugi Tanaka, Nagoya (JP); Yoshikazu Shimizu, Kasugai (JP); Takahiro Nishimoto, Ogaki (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 64 days.

(21) Appl. No.: 18/053,897

(22) Filed: Nov. 9, 2022

(65) Prior Publication Data

US 2023/0144080 A1 May 11, 2023

(30) Foreign Application Priority Data

Nov. 11, 2021 (JP) ................................ 2021-183927

(51) Int. Cl.
*B41J 11/00* (2006.01)

(52) U.S. Cl.
CPC ...... *B41J 11/00214* (2021.01); *B41J 11/0024* (2021.01)

(58) Field of Classification Search
CPC ......................... B41J 11/00214; B41J 11/0024
See application file for complete search history.

(56) References Cited

U.S. PATENT DOCUMENTS 9,327,524 B1 5/2016 Yamada et al.

FOREIGN PATENT DOCUMENTS

| | | | | |
|---|---|---|---|---|
| EP | 1336500 | A2 * | 8/2003 | ............ B41J 11/002 |
| JP | 2001212948 | A | 8/2001 | |
| JP | 2001341294 | A | 12/2001 | |
| JP | 2007230171 | A | 9/2007 | |
| JP | 2016112855 | A | 6/2016 | |

* cited by examiner

*Primary Examiner* — Justin Seo
(74) *Attorney, Agent, or Firm* — Scully, Scott, Murphy & Presser, PC

(57) ABSTRACT

There is provided an image recording apparatus including: a conveyer configured to convey a sheet in a conveying direction; a head configured to discharge a liquid toward the sheet; a heater configured to heat the sheet and/or the liquid on the sheet; a reader positioned downstream in the conveying direction of the heater, the reader being configured to read an image, on the sheet, formed by the head and the heater; and a holder positioned between the reader and the heater in the conveying direction, the holder being configured to hold a body of rotation configured to contact a recording surface of the sheet. In a crossing direction orthogonal to the conveying direction and crossing the recording surface of the sheet being conveyed by the conveyer, both ends in the crossing direction of the holder are positioned outside of both ends in the crossing direction of the reader.

9 Claims, 10 Drawing Sheets

IMAGE RECORDING APPARATUS

REFERENCE TO RELATED APPLICATIONS

This application claims priority from Japanese Patent Application No. 2021-183927 filed on Nov. 11, 2021. The entire content of the priority application is incorporated herein by reference.

BACKGROUND ART

There is a known image recording apparatus which heats at least one of a sheet and a liquid discharged onto the sheet so as to fix the liquid to the sheet. An example of such a printing apparatus is provided with a recording head which records a color measuring pattern on a sheet; a drying part which dries the sheet on which the color measuring pattern is recorded; and a color measuring device which measures the color measuring pattern. In an example of such a printing apparatus, a near infrared lamp in the drying part is covered by a drying part-cover from thereabove, thereby preventing any radiation and/or diffusion of the drying heat to the outside of the drying part; and the color measuring device is covered by a color measuring device-cover from thereabove, thereby preventing any variation or fluctuation in the color measuring due to any increase in the temperature inside the color measuring device-cover.

DESCRIPTION

Although the above-described printing apparatus is provided with the drying part-cover and the color measuring device-cover, the printing apparatus is not considered to be sufficiently suppressing any adverse effect caused by the radiation and/or the diffused heat from the near infrared lamp to another or other electric part(s) or component(s).

An object of the present disclosure is to provide an image recording apparatus configured to heat a sheet and/or a liquid discharged onto the sheet so as to fix the liquid to the sheet, the image recording apparatus being capable of suppressing the effect or influence of the heat with respect to a reading part.

(1) An image recording apparatus according to an aspect of the present disclosure includes: a conveyer configured to convey a sheet in a conveying direction; a head configured to discharge a liquid toward the sheet; a heater configured to heat the sheet and/or the liquid on the sheet; a reader positioned downstream in the conveying direction of the heater, the reader being configured to read an image, on the sheet, formed by the head and the heater; and a holder positioned between the reader and the heater in the conveying direction, the holder being configured to hold a body of rotation configured to contact a recording surface of the sheet. In a crossing direction orthogonal to the conveying direction and crossing the recording surface of the sheet being conveyed by the conveyer, both ends in the crossing direction of the holder are positioned outside of both ends in the crossing direction of the reader.

According to the aspect of the present disclosure, since the holder functions as a heat shielding wall (heat insulating wall) with respect to the radiation heat of the heater (fixer, fixing part), the radiation heat of the heater is less likely to reach the reader (reading part).

(2) In an aspect of the present disclosure, the holder may have a first wall positioned upstream in the conveying direction of a rotation axis of the body of rotation and extending in the crossing direction, and a second wall positioned downstream in the conveying direction of the rotation axis of the body of rotation and extending in the crossing direction.

Since each of the two walls which are the first wall and the second wall functions as a heat shielding wall with respect to the radiation heat of the heater, the radiation heat of the heater is less likely to reach the reader.

(3) In an aspect of the present disclosure, the first wall and the second wall may extend in a first direction crossing the conveying direction and crossing the crossing direction.

In each of the first wall and the second wall, the function as the heat shielding wall with respect to the radiation heat of the heater is further exhibited.

(4) In an aspect of the present disclosure, the holder may further include a third wall closing a space between a first end in the crossing direction of the first wall and a first end in the crossing direction of the second wall, and a fourth wall closing a space between a second end in the crossing direction of the first wall and a second end in the crossing direction of the second wall.

Since an air layer (air cavity) surrounded by the first wall, the second wall, the third wall and the fourth wall is formed or defined in the holder, the radiation heat of the heater is less likely to be transmitted to the holder.

(5) In an aspect of the present disclosure, a slit may be formed in the third wall. A part of the body of rotation may protrude to outside of the third wall via the slit.

It is possible to cause the body of rotation to make contact with the recording surface of the sheet, while maintaining or retaining the air layer surrounded by the first wall, the second wall, the third wall and the fourth wall.

(6) In an aspect of the present disclosure, a cleaner configured to make contact with the body of rotation may be positioned between the first wall and the second wall. The cleaner may be aligned with the body of rotation in the crossing direction.

It is possible to remove the liquid adhered to the body of rotation by the cleaner.

(7) In an aspect of the present disclosure, the image recording apparatus may further include a frame configured to support the holder. The holder may be detachably attached with respect to the frame.

Since a user is capable of detaching the holder from the frame, the user is capable of easily exchanging the cleaner.

(8) In an aspect of the present disclosure, both ends in the first direction of the first wall may be positioned outside, respectively, of both ends in the first direction of the heater.

In the first wall, the function as the heat shielding wall with respect to the radiation heat of the heater is further exhibited.

According to the present disclosure, it is possible to suppress occurrence of any reading failure (unsatisfactory reading) in the image recording apparatus which heats the sheet and/or the liquid discharged onto the sheet so as to fix the liquid to the sheet.

Figure 3:
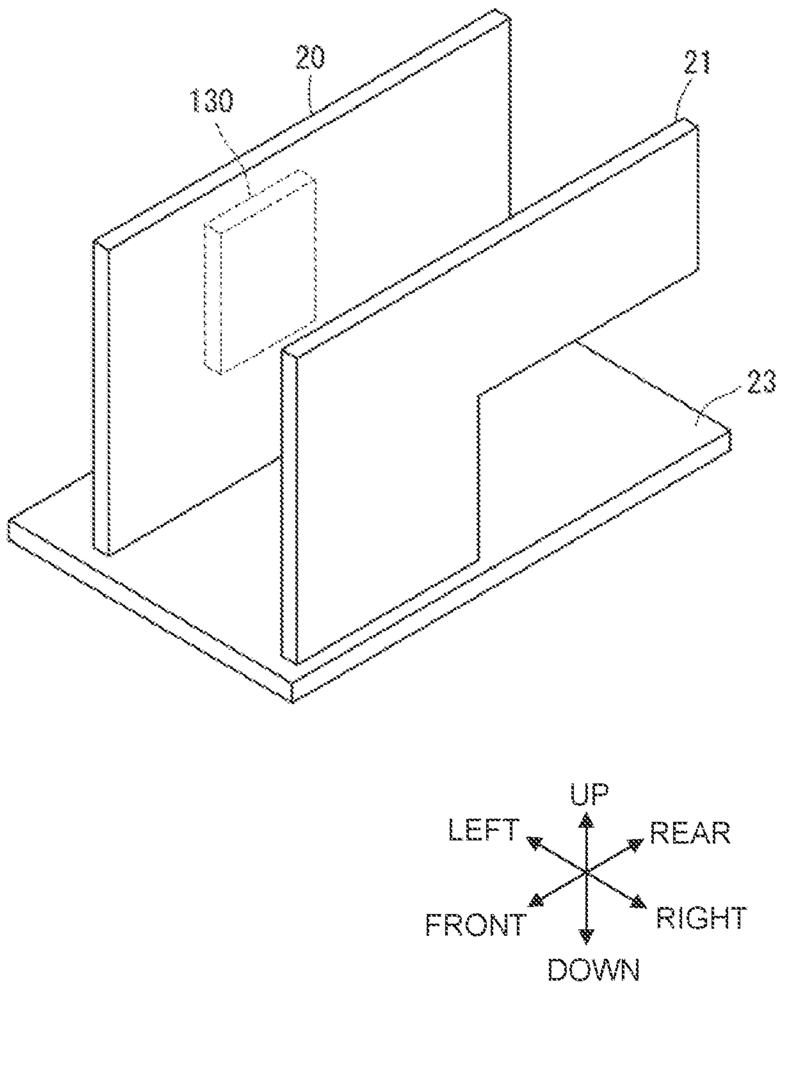

FIG. 3 is a perspective view depicting side frames 20 and 21 attached to a base 23.

Figure 1:
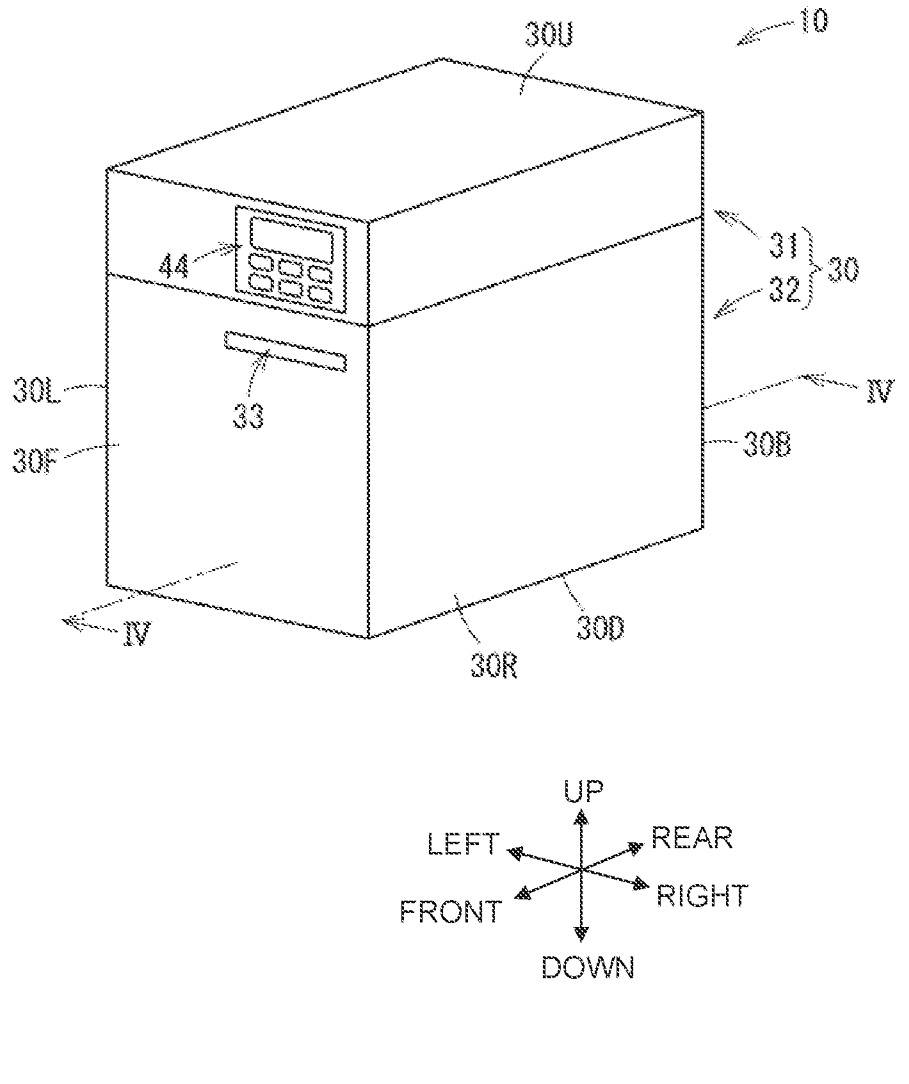
FIG. 1 is a perspective view depicting the outer appearance of an image recording apparatus 10.
Figure 2:
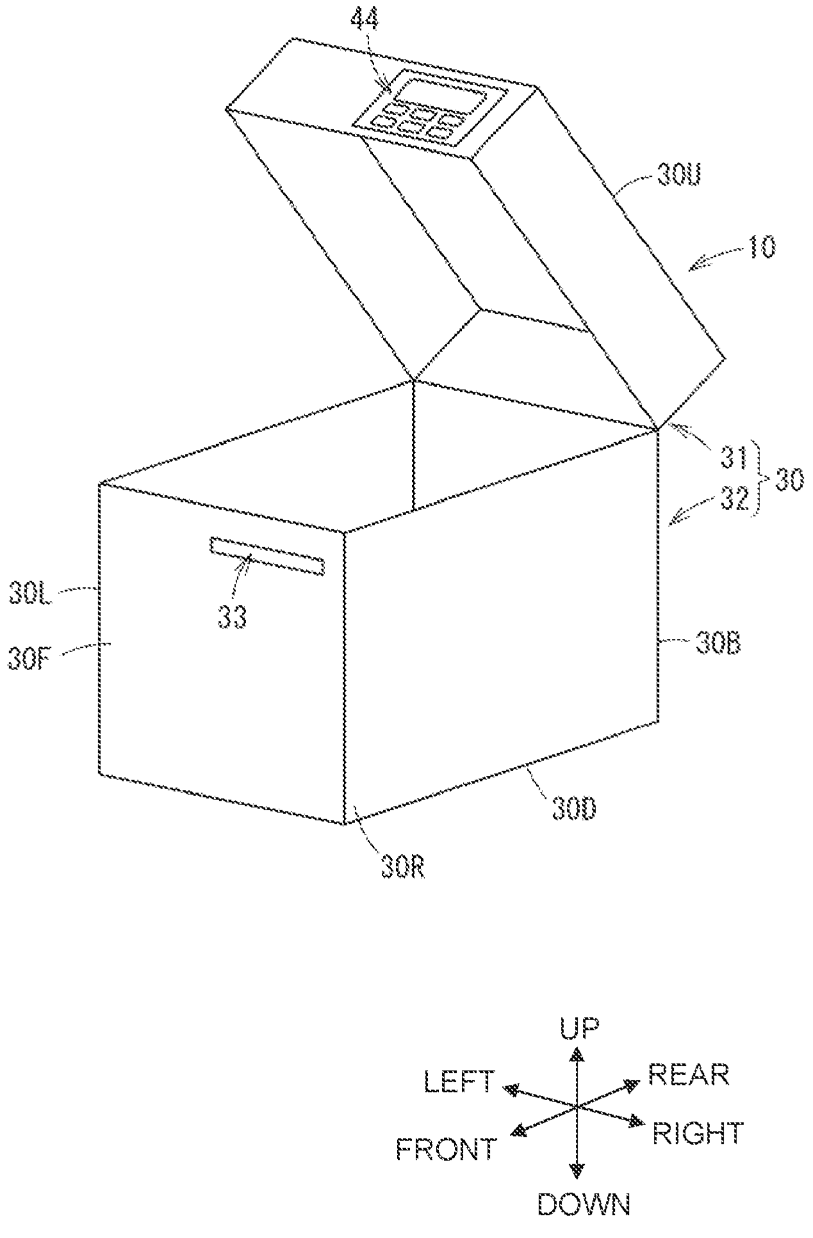
FIG. 2 is a perspective view depicting the outer appearance of the image recording apparatus 10 in a state that an upper casing 31 is opened.
Figure 4:
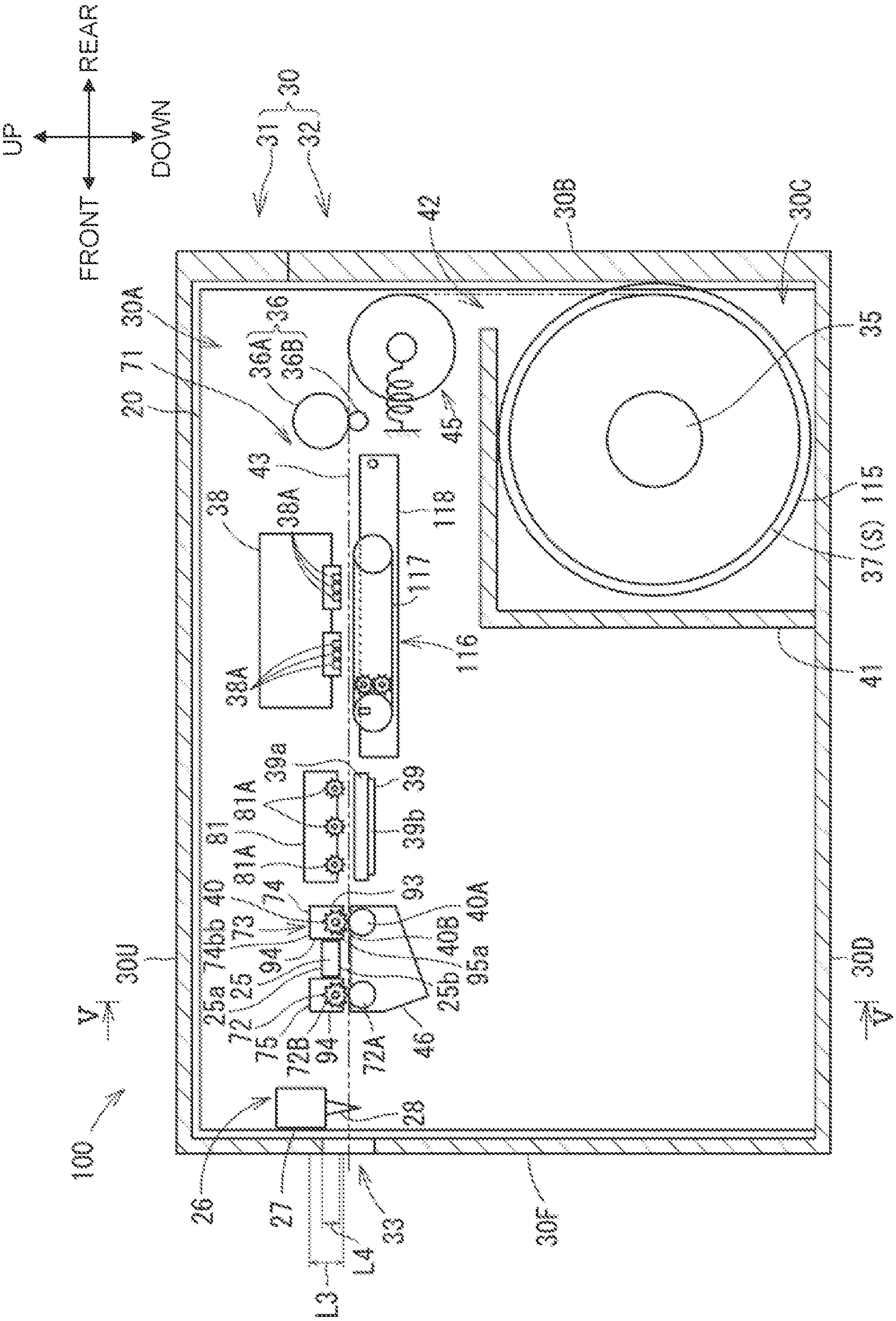

FIG. 4 is a cross-sectional view of a IV-IV cross section of FIG. 1.

Figure 5:
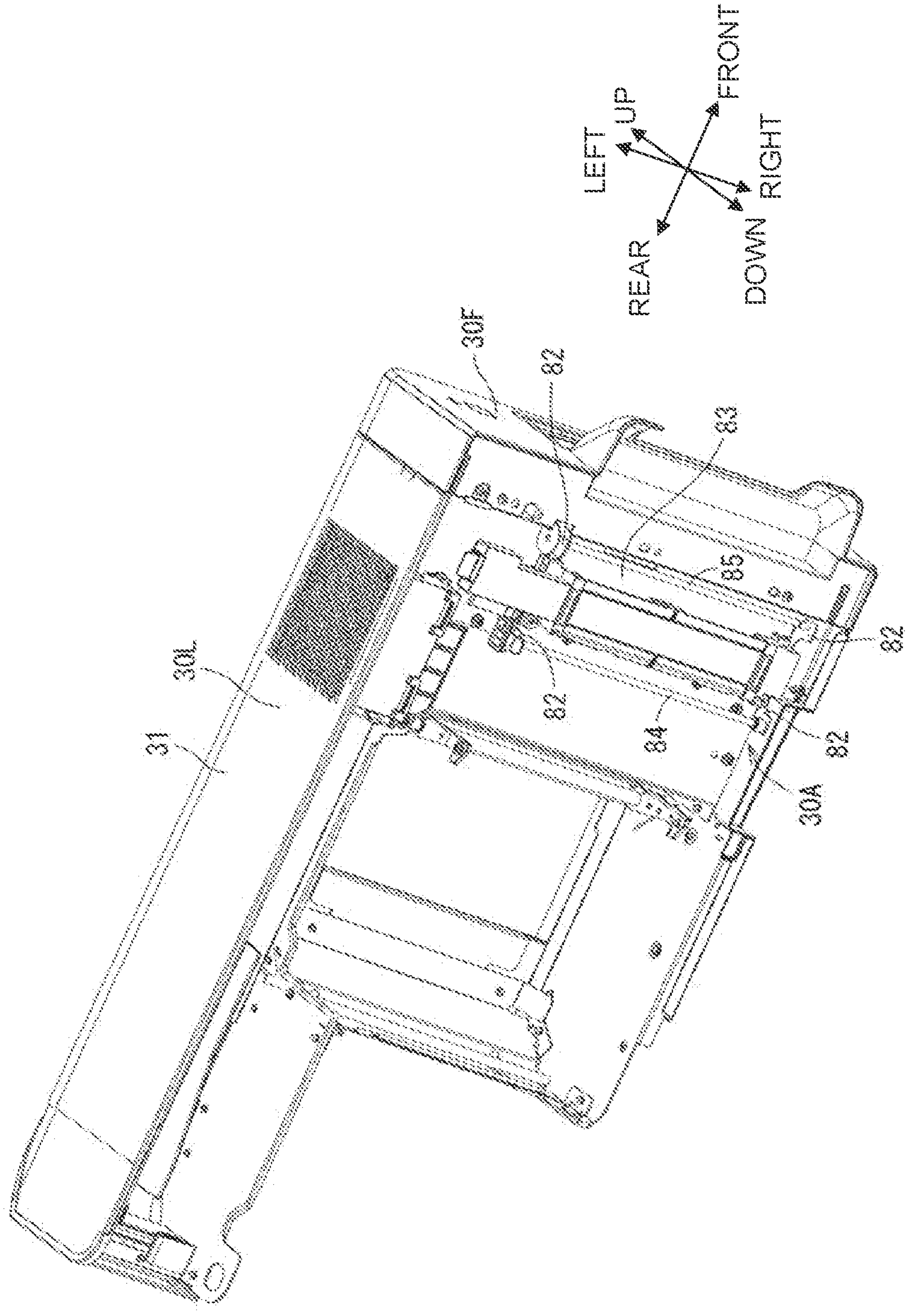

FIG. 5 is a perspective view of the upper casing 31 as seen obliquely therebelow.

Figure 6:
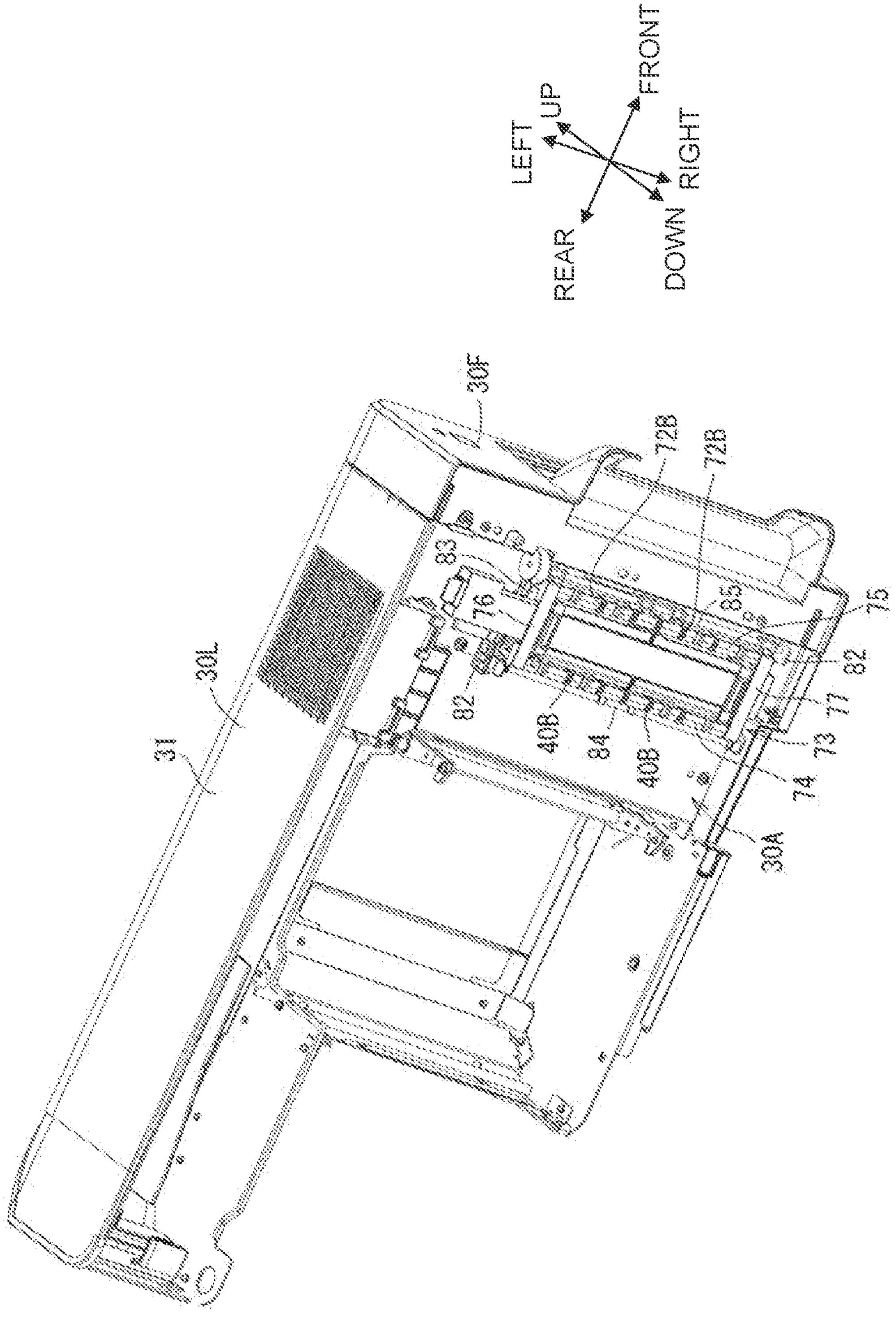

FIG. 6 is a perspective view of a state that a holding member 73 is attached to a first shaft 84 and a second shaft 85 of FIG. 5.

Figure 7:
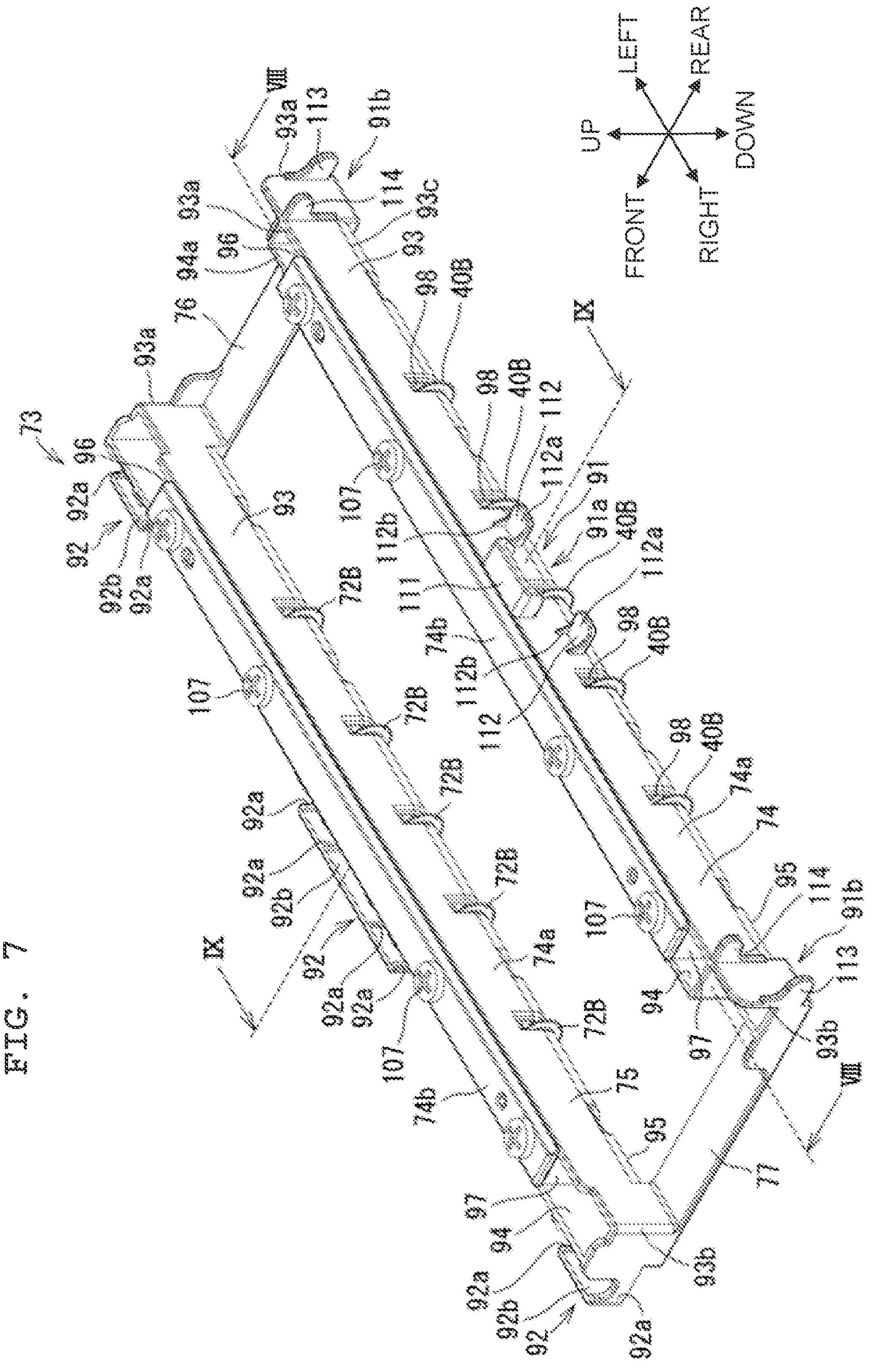

FIG. 7 is a perspective view of the holding member 73.

Figure 8:
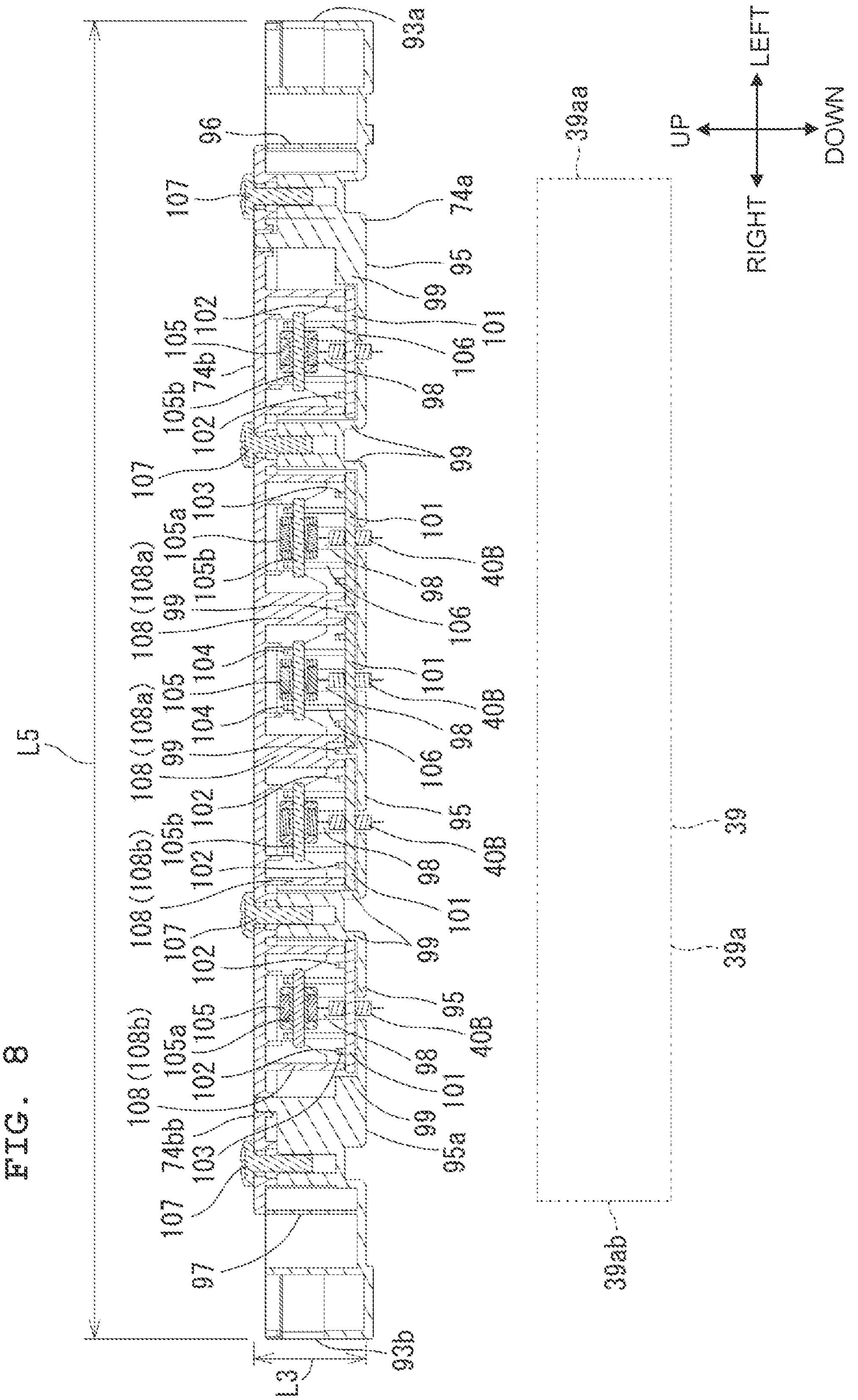

FIG. 8 is a cross-sectional view of a VIII-VIII cross section of FIG. 7.

Figure 9:
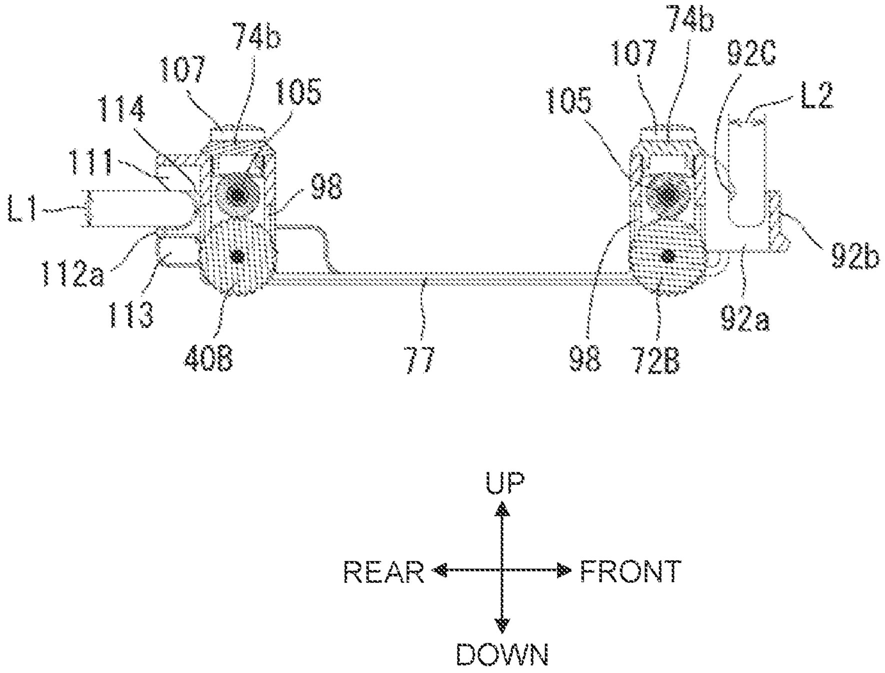

FIG. 9 is a cross-sectional view of a IX-IX cross section of FIG. 7.

Figure 10:
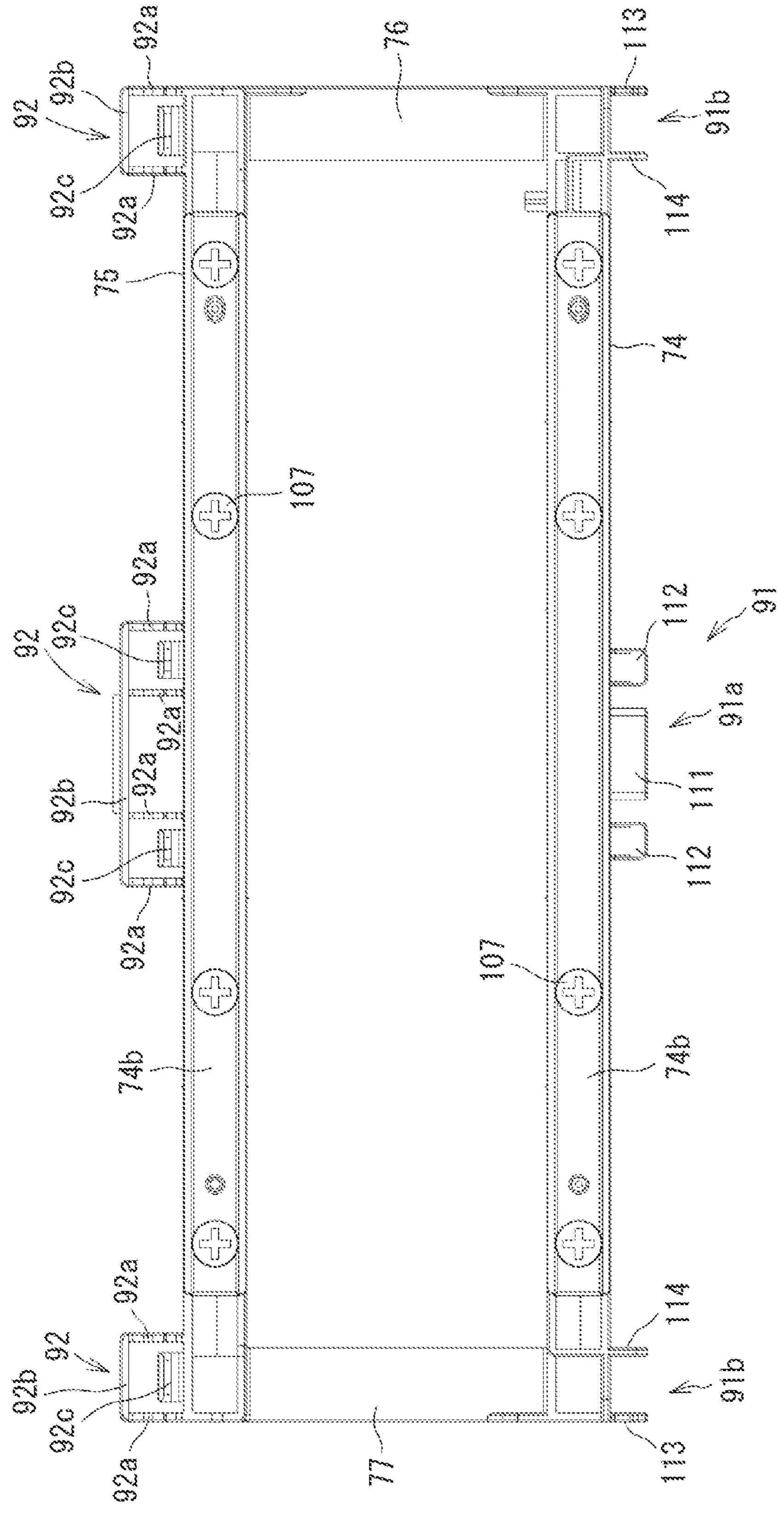

FIG. 10 is a plan view depicting the holding member 73.

In the following, an embodiment of the present disclosure will be explained, with reference to the drawings as appropriate. Note that the embodiment which is to be explained below is merely an example in which the present disclosure is embodied; it is needless to say that the embodiment can be appropriately changed without changing the gist of the present disclosure. In the following explanation, a direction (orientation) in which a discharge port 33 faces or is oriented in an image recording apparatus 10 is referred to as a front direction (front orientation), a direction (orientation) opposite to the front direction is referred to as a rear direction (rear orientation). The front direction and the rear direction are collectively referred to as a front-rear direction. An up-down direction orthogonal to the front-rear direction is referred to as an up-down direction. A direction orthogonal to the front-rear direction and the up-down direction is referred to as a left-right direction. The up direction (up orientation) of the up-down direction is referred to as an up direction (up orientation), the down direction (down orientation) in the up-down direction is referred to as a down direction (down orientation). In a case that an image recording apparatus 10 is seen in the rear direction, the left direction (orientation) of the left-right direction is referred to as a left direction (left orientation), and the right direction (right orientation) in the left-right direction is referred to as a right direction (right orientation).

[Configuration of Outer Appearance of Image Recording Apparatus 10]

The image recording apparatus 10 as depicted in FIG. 1 records, in the ink-jet recording system, an image on a sheet S pulled or drawn from a roll body 37 (see FIG. 4). Note that in FIGS. 1 to 4, the image recording apparatus 10 and respective parts or components thereof are schematically depicted.

As depicted in FIG. 1, the image recording apparatus 10 is provided with a casing 30. The casing 30 is provided with an upper casing 31 and a lower casing 32. The upper casing 31 and the lower casing 32 have, as a whole, a shape which is substantially rectangular parallelepiped, and have a size which can be placed on a table, desk, etc. In the following, in a case that an explanation is made regarding the casing 30, the explanation is made assuming that the upper casing 31 and the lower casing 32 have the rectangular parallelepiped shape as a whole.

The casing 30 has a right surface 30R, a left surface 30L, an upper surface 30U, a lower surface 30D, a front surface 30F, and a rear surface 30B. The right surface 30R and the left surface 30L are positioned apart in the left-right direction. The upper surface 30U and the lower surface 30D are positioned apart in the up-down direction. The front surface 30F and the rear surface 30B are positioned apart in the front-rear direction.

The upper casing 31 is connected to the rear surface 30B of the lower casing 32 so that the upper casing 31 is pivotable (rotatable) around a pivot axis extending in the left-right direction. The upper casing 31 is pivotally moved from a close position depicted in FIG. 1 so that the front surface 30F is lifted upward to pivot (rotate) to an open position depicted in FIG. 2. In a case that the upper case 31 is pivoted to be in the open position, an internal space 30A (FIG. 4) of the casing 30 is exposed to the outside. Note that in FIG. 2, an internal structure of the casing 30 is omitted.

As depicted in FIG. 1, the front surface 30F of the casing 30 is formed with a discharge port 33 which extended to be slender in the left-right direction. The center in the left-right direction of the discharge port 33 is positioned on the right side with respect to the center in the left-right direction of the front surface 30. The discharge port 33 causes the internal space 30A of the casing 30 to communicate with the outside. The sheet S for which image recording has been performed in the internal space 30A of the casing 30 is discharged to the outside of the casing 30 through the discharge port 33.

An operation panel 44 is provided on the front surface 30F of the casing 30. The operator panel 44 is positioned above the discharge port 33. The operation panel 44 receives input, from a user, the input being for operating the image recording apparatus 10 or for confirming a variety of kinds of settings.

As depicted in FIG. 3, two side frames 20, 21 are provided on the internal space 30A of the casing 30. Each of the side frames 20, 21 has a shape of a flat plate made of a steel plate, and a cutout, a through hole, etc., of which shape(s) is/are in accordance with a member which is supported by each of the side frames 20, 21, are formed in each of the side frames 20 and 21, as appropriate. The two side frames 20, 21 are positioned to be apart from each other in the left-right direction. The side frames 20, 21 are connected to a base 23 forming the lower surface 30D of the casing 30. The connection between the side frames 20, 21 and the base 23 is made by a screwing, a welding, etc.

[Internal Configuration of Image Recording Apparatus 10]

A roll-body holder 35, a tensioner 45, a conveying part (conveyer) 71, a recording head 38, a supporting mechanism 116, a fixing part 39, a jam cover 81, a supporting member 46, a contact image sensor (hereinafter referred to as "CIS") 25 (an example of a "reader"), a cutter unit 26 are arranged at a location between the side frames 20, 21 in the internal space 30A.

As depicted in FIG. 4, in the internal space 30A, a partition wall 41 is provided between the side frames 20 and 21. The partition wall 41 is located at a lower part on the rear side in the internal space 30A. The partition wall 41 cooperates with the lower casing 32 to define a sheet accommodating space 30C. The sheet accommodating space 30C is a space surrounded by the partition wall 41 and the lower casing 32 and separated or isolated from the recording head 38, etc.

The roll body 37 is accommodated in the sheet accommodating space 30C. The roll body 37 has a core tube and a long sheet S. The sheet S is wound around the core tube in a roll shape in a circumferential direction of the axis of the core tube. The sheet S may have a width ranging from a minimum width to a maximum width in which the image recording apparatus 10 is capable of recording an image. Namely, a plurality of types of the roll body 37 having different widths are accommodatable in the sheet accommodating space 30C. Note that it is allowable that the roll body 37 does not have the core tube and that the sheet S is wound in a roll shape so that the sheet S is installable in the roll-body holder 35. Also note that the sheet accommodating space 30C may accommodate a fan-folded paper.

The roll-body holder 35 is positioned in the sheet accommodating space 30C. The roll body 37 is installed in the roll-body holder 35. In a case that the roll body 37 is installed in the roll-body holder 35, the roll-body holder 35 supports the roll body 37 so that the roll body 37 is rotatable in the circumferential direction of the axis of the core tube of the roll body 37 in a state that the axis of the core tube is along the left-right direction.

The roll-body holder 35 is provided with a pair of side guides 115 separated from each other in the left-right direction. A distance between the pair of side guides 115 in the left-right direction is changeable. A user moves the pair of side guides 115 so as to cause the pair of side guides 115 to make contact, respectively, with left and right ends of the roll body 37, in accordance with the width (the size along the left-right direction) of the roll body 37 installed to the roll-body holder 35. The roll body 37 of which left and right ends make contact, respectively, with the pair of side guides 115 is positioned so that the center in the width direction of the sheet S is coincident with the center in the left-right direction of a conveying route 43. The roll-body holder 35 rotates in a case that the roll-body holder 35 receives a driving force from a non-illustrated motor. Accompanying with the rotation of the roll-body holder 35, the roll body 37 supported by the roll-body holder 35 also rotates.

A rear part of the sheet accommodating space 30C is opened upward. Specifically, a gap 42 is defined between the partition wall 41 and the rear surface 30B, namely, at a position above a rear end of the roll body 37. The sheet S is drawn upward from the rear end of the roll body 37, and the drawn sheet S is guided to the tensioner 45 via the gap 42.

At a rear part of the internal space 30A, the tensioner 45 is positioned above the partition wall 41. The tensioner 45 is a roller supported by the side frames 20, 21 so that the tensioner 45 is rotatable. The tensioner 45 is supported by the side frames 20, 21 so that the tensioner 45 is movable in the front-rear direction. An urging force in the rear direction is applied to the tensioner 45 by an urging member such as a spring, etc.

The conveying part 71 draws the sheet S from the roll body 37, and conveys the sheet S in the front direction (an example of a "conveying direction"). The conveying part 71 has a conveying roller pair 36, a first discharging roller pair 40, and a second discharging roller pair 72.

The conveying roller pair 36 is positioned in front of the tensioner 45. The conveying roller pair 36 has a conveying roller 36A and a pinch roller 36B. The conveying roller 36A is rotatably supported by the frames 20 and 21. The conveying roller 36A rotates by receiving a driving force from a non-illustrated motor, thereby conveying the sheet S in the front direction while nipping the sheet S between the conveying roller 36A and the pinch roller 36B.

The first discharging roller pair 40 is positioned in front of the conveying roller pair 36. The first discharging roller pair 40 has a discharging roller 40A which makes contact with a lower surface of the sheet S, and spurs 40B (an example of a "body of rotation") which makes contact with an upper surface of the sheet S. The discharging roller 40A is rotatably supported by the side frames 20, 21. The spurs 40B are rotatably supported by a first spur holder 74 (an example of a "holder"; to be described later on). The discharging roller 40A rotates by receiving a driving force from a non-illustrated motor, thereby conveying the sheet S in the front direction while nipping the sheet S between the discharging roller 40A and the spurs 40B.

The second discharging roller pair 72 is positioned in front of the first discharging roller pair 40. The second discharging roller pair 72 has a discharging roller 72A which makes contact with the lower surface of the sheet S, and spurs 72B which makes contact with the upper surface of the sheet S. The discharging roller 72A is rotatably supported by the side frames 20, 21. The spurs 72B are rotatably supported by a second spur holder 75 (to be described later on). The discharging roller 72A rotates by receiving a driving force from a non-illustrated motor, thereby conveying the sheet S in the front direction while nipping the sheet S between the discharging roller 72A and the spurs 72B.

The recording head 38 is positioned at a location which is in front of (on the front side with respect to) the conveying roller pair 36 and behind (on the rear side with respect to) the first discharging roller pair 40. The recoding head 38 has a plurality of nozzles 38A. Each of the plurality of nozzles 38A discharges or ejects an ink (an example of a "liquid") downwardly, as a liquid droplet, toward the sheet S supported by a conveying belt 117. With this, an image is recorded on the upper surface of the sheet S. A non-illustrated tank which stores the ink is connected to the recording head 38 by a non-illustrated tube so that the ink can be supplied from the tank to the recording head 38.

As the ink, a water-based ink which includes water, a pigment and thermoplastic resin fine particles is used. Note that the ink is not particularly limited, provided that the ink can be fixed to the sheet S by heating. In the present embodiment, the ink adhered to the sheet S is heated by the heating part 39 to thereby melt the thermoplastic resin fine particles; and then the ink is subjected to cooling thereafter to thereby cure or harden the molten resin, thereby fixing the pigment included in the ink to the sheet S.

The supporting mechanism 116 is positioned at a location in front of the conveying roller pair 36. The supporting mechanism 116 is positioned below the recording head 38. The supporting mechanism 116 face or is opposite to the recording head 38 in the up-down direction. The supporting mechanism 116 has the conveying belt 117, and a supporting part 118 which supports the conveying belt 117. A driving force from a non-illustrate motor is transmitted to the conveying belt 117 so as to drive and rotate the conveying belt 117, thereby causing the conveying belt 117 to convey the sheet S in the front direction while supporting the lower surface of the sheet S.

The fixing part (heater) 39 is positioned, in the front-rear direction, between the recording head 38 and the first discharging roller pair 40. The fixing part 39 is fixed to the side frames 20, 21. The fixing part 39 has: a metallic plate 39*a* which has a shape of a flat plate and which extends in the front-rear direction and the left-right direction; and a polyimide heater 39*b* which is fixed to a lower surface of the metallic plate 39*a*. The metallic plate 39*a* supports the lower surface of the sheet S which is (being) conveyed in the front direction by the conveying belt 117. Accordingly, a size in the left-right direction of the metallic plate 39*a* is greater than the maximum width, of the sheet S, in which the image recording apparatus 10 is capable of recording an image. The polyimide heater 39*b* heats the lower surface of the metallic plate 39*a*. With this, while the sheet S is passing on the metallic plate 39*a*, the thermoplastic resin fine particles included in the ink is melt by the heat of the metallic plate 39*a*, and the molten resin is cured by a cooling by the atmosphere after the sheet S has passed the metallic plate 39*a*, thereby fixing the pigment to the upper surface of the sheet S. Note that it is allowable to heat the metallic plate 39*a* by a heater, such as an infrared heater, instead of the polyimide heater 39*b*.

The jam cover 81 is arranged so as to cover a location above the fixing part 39. The jam cover 81 is attached to the side frames 20, 21. The jam cover 81 is formed to have a box shape having an internal space which extends in the front-rear direction, the up-down direction and the left-right direction. An upper surface and a lower surface of the jam cover 81 are rectangular which is longer in the left-right direction than in the front-rear direction. The jam cover 81 is formed of a material made of a resin. The material of the jam cover 81 is not particularly limited, provided that the material is capable of securing a strength and a heat-resisting property which are of not less than a certain level. For example, the jam cover 81 is formed of polypropylene, polycarbonate, a phenol resin, etc. The jam cover 81 has, in the internal space thereof, a plurality of spurs 81A which project in the down direction from the lower surface of the jam cover 81. The plurality of spurs 81A make contact with the upper surface (recording surface) of the sheet S which is (being) conveyed in the front direction by the conveying belt 117.

The supporting member 46 is positioned in front of the fixing part 39. A front part of the supporting member 46 faces or is opposite to the spurs 72B in the up-down direction. A rear part of the supporting member 46 faces or is opposite to the spurs 40B in the up-down direction. The supporting member 46 supports the lower surface of the sheet S which is (being) conveyed in the front direction by the first discharging roller pair 40.

The CIS 25 is positioned in front of the fixing part 39. The CIS 25 is positioned above the supporting member 46. The CIS 25 is positioned, in the front-rear direction, between the first discharging roller pair 40 and the second discharging roller pair 72. The CIS 25 is configured as below. That is, a reflected light, of a light emitted or radiated from a light source such as an LED and reflected off (by) the sheet S, is collected by a gradient index lens and to a line sensor; and the CIS 25 outputs an electric signal corresponding to the intensity of the reflected light received by the line sensor. The CIS 25 is configured to output an electric signal corresponding to a reflected light by an image on the recording surface (upper surface) of the sheet S. A direction in which the line sensor is aligned, namely a reading line, is along the left-right direction. A length of the reading line of the CIS 25 is longer than the maximum width, of the sheet S, in which the image recording apparatus 10 is capable of recording an image. In the present embodiment, a size in the left-right direction of the CIS 25 is similar to a size in the left-right direction of the metallic plate 39*a*.

The cutter unit 26 is positioned in front of the second discharging roller pair 72. The cutter unit 26 has a configuration wherein a cutter 28 is mounted on a cutter carriage 27. The cutter carriage 27 moves in the left-right direction, by a non-illustrated belt-driving mechanism, etc. Accompanying with the movement of the cutter carriage 27, the cutter 28 moves also in the left-right direction. By the movement of the cutter 28, the sheet S positioned between the second discharging roller pair 72 and the discharge port 33 is cut along the left-right direction.

As depicted in FIG. 3, a substrate 130 is fixed to the side frame 20 at a left side part thereof. An arithmetic element serving as a controller, a chip for a communication interface, various connectors, etc., are mounted on the substrate 130. The substrate 130 is connected, by a non-illustrated flat cable, etc., to the recording head 38, the motor(s), the operation panel 44, etc., so that an electrical signal can be transmitted and received. Further, an electric power is supplied from a non-illustrated power supply unit to the substrate 130.

As depicted in FIG. 5, a supporting frame 83 (an example of a "frame") is arranged in the internal space 30A of the upper casing 31. Both ends in the left-right direction of the supporting frame 83 are bent downward to thereby form four supporting parts 82. The four supporting parts 82 each extend in the front-rear direction and in the up-down direction. The four supporting parts 82 are arranged such that two pieces and other two pieces are apart from each other in the left-right direction to form a pair. Each of the four supporting parts 82 has a shape of a substantially rectangular flat plate in which a size thereof in the front-rear direction is longer than a size thereof in the up-down direction. The supporting frame 83 is fixed to an inner wall surface of the upper casing 31. The two supporting parts 82 which form a pair supports a first shaft 84 having a columnar shape and extending in the left-right direction, and the other two supporting parts 82 which form another pair supports a second shaft 85 having a columnar shape and extending in the left-right direction. The first shaft 84 is positioned on the rear side with respect to the second shaft 85.

As depicted in FIGS. 5 and 6, a holding member 73 is detachably attached to the first shaft 84 and the second shaft 85. As depicted in FIG. 4, the holding member 73 is positioned above the supporting member 46. The holding member 73 is formed of a material made of a resin. The material of the holding member 73 is not particularly limited, provided that the material is capable of securing a strength and a heat-resisting property which are of not less than a certain level. For example, the holding member 73 is formed of polypropylene, polycarbonate, a phenol resin, etc.

As depicted in FIG. 7, the holding member 73 has a first spur holder 74 (an example of a "holder"), a second spur holder 75, a first connecting member 76 and a second connecting member 77 which connect the first spur holder 74 and the second spur holder 75, and a first fitting part 91 and a second fitting part 92 which are detachably fitted, respectively, to the first shaft 84 and the second shaft 85.

As depicted in FIGS. 4 and 7, the first spur holder 74 is positioned, in the front-rear direction, between the CIS 25 and the fixing part 39. The first spur holder 74 holds the spurs 40B. The first spur holder 74 has a body part 74*a* which is opened in the up direction, a lid part 74*b* (an example of a "fourth wall") which closes an opening of the body part 74*a*, a plurality of spurs 40B, and a plurality of spur cleaners 105 (an example of a "cleaner"; FIGS. 8 and 9). The body part 74*a* has a rear wall part 93 (an example of a "first wall"), a front wall part 94 (an example of a "second wall"), a bottom wall part 95 (an example of a "third wall"), a left wall part 96 and a right wall part 97.

As depicted in FIG. 7, the rear wall part 93 is positioned behind the spurs 40B. The rear wall part 93 has a shape of a flat plate which has a thickness in the front-rear direction. The rear wall part 93 extends in the up-down direction and the left-right direction. A front surface and a rear surface of the rear wall part 93 each have a rectangular shape which is longer in the left-right direction than in the up-down direction. As depicted in FIG. 8, a length L5 in the left-right direction (an example of a "first direction") of the rear wall part 93 is longer than a length in the left-right direction of the metallic plate 39*a* of the fixing part 39. A left end 93*a* of the rear wall part 93 is located on the left side with respect to a left end 39*aa* of the metallic plate 39*a*. A right end 93*b* of the rear wall part 93 is located on the right side with respect to a right end 39*ab* of the metallic plate 39*a*.

The front wall part 94 is located in front of the spurs 40B. The front wall part 94 has a shape of a flat plate which has a thickness in the front-rear direction. The front wall part 94 extends in the up-down direction and the left-right direction. A front surface and a rear surface of the front wall part 94 each have a rectangular shape which is longer in the left-right direction than in the up-down direction. A length in the left-right direction of the front wall part 94 is shorter than a length in the left-right direction of the rear wall part 93. The front wall part 94 faces the rear wall part 93 in the front-rear direction.

The bottom wall part 95 connects or links a lower end 93*c* of the rear wall part 93 and a lower end of the front wall part 94. The bottom wall part 95 extends in the front-rear direction and the left-right direction. A rear end side of the bottom wall 95 extends in the rear direction and the up direction while being curved, and connects to the lower end 93*c* of the rear wall part 93.

The left wall part 96 has a shape of a flat plate which has a thickness in the left-right direction. The left wall part 96 extends in the front-rear direction and the up-down direction. The left wall part 96 connects a location in the vicinity of a left end part in the rear surface of the front wall part 94 and a location in the vicinity of a left end part in the front surface of the rear wall part 93. The right wall part 97 has a shape of a flat plate which has a thickness in the left-right direction. The right wall part 97 extends in the front-rear direction and the up-down direction. The right wall part 97 connects a location in the vicinity of a right end part in the rear surface of the front wall part 94 and a location in the vicinity of a right end part in the front surface of the rear wall part 93.

As depicted in FIGS. 7 to 9, the rear wall part 93, the bottom wall part 95 and the front wall part 94 are formed with a plurality of first slits 98 (an example of a "slit") which extend along the front-rear direction. The plurality of first slits 98 are arranged in the left-right direction with a spacing distance therebetween. In the present embodiment, the plurality of first slits 98 are provided as five first slits 98. Each of the plurality of first slits 98 extends in the down direction from a substantially intermediate position in the up-down direction of the rear wall part 93, and reaches up to a rear end edge of the bottom wall part 95. Each of the plurality of first slits 98 extends in the front direction from the rear end edge of the bottom wall part 95, and reaches up to the lower end of the front wall part 94. Each of the plurality of first slits 98 extends in the up direction from the lower end of the front wall part 94, and reaches up to a substantially intermediate position in the up-down direction of the front wall part 94.

As depicted in FIG. 8, a plurality of regulating pieces 99 extending upward from the upper surface of the bottom wall part 95 are formed. The plurality of regulating pieces 99 are arranged so that each of the plurality of first slits 98 is interposed between two pieces of the plurality of regulating pieces 99 in the left-right direction. Two regulating pieces 99 between which a certain first slits 98 is interposed are positioned with equal spacing distances from the certain first slit 98 in the left-right direction. Each of the plurality of regulating pieces 99 has a shape of a flat plate extending in the front-rear direction and the up-down direction. Each of the plurality of regulating pieces 99 extends, in the front-rear direction from the front surface of the rear wall part 93 up to the rear surface of the front wall part 94. The spacing distance in the left-right direction of each two first regulating pieces 99 between which one of the plurality of first slits 98 is interposed is slightly longer than a length in the axial direction (axial length) of a first rotating shaft 101 of the spur 40B.

Two first supporting pieces 102 extending upward from the upper surface of the bottom wall part 95 are formed between the two regulating pieces 99 between which one of the plurality of first slits 98 are interposed. The two first supporting pieces 102 are positioned with equal spacing distances from the first slit 98 in the left-right direction. Each of the first supporting pieces 102 has a shape of a flat plate extending in the front-rear direction and the up-down direction. Each of the first supporting pieces 102 extends in the front-rear direction from the front surface of the rear wall part 93 up to the rear surface of the front wall part 94. Each of the first supporting pieces 102 is formed with a second slit 103 which is opened in an upper end of the first supporting piece 102 and which extends in the down direction. The second slit 103 reaches up to a position adjacent to the upper surface of the bottom wall part 95, from the upper end of the first supporting piece 102. The second slit 103 is positioned at an intermediate position in the front-rear direction of the first supporting piece 102.

Two second supporting pieces 104 (in FIG. 8, the reference numeral "104" is affixed only to a part of the second supporting pieces 104) extending upward from the upper surface of the bottom wall part 95 are formed between each two first supporting pieces 102 between which one of the plurality of first slits 98 is interposed. The two second supporting pieces 104 face each other, in the left-right direction, with equal spacing distances from the first slit 98 in the left-right direction. Each of the second supporting pieces 104 has a shape of a flat plate extending in the front-rear direction and the up-down direction. Each of the second supporting pieces 104 extends in the front-rear direction from the front surface of the rear wall part 93 up to the rear surface of the front wall part 94. Each of the second supporting pieces 104 extends upward to a location above the first supporting pieces 102. A spacing distance between each two second supporting pieces 104 between which one of the plurality of first slits 98 is interposed is slightly longer than an axial length of a rotating part 105*a* of the spur cleaner 105. Each of the second supporting pieces 104 is formed with a third slit 106 which is opened in an upper end of the second supporting piece 104 and which extends in the down direction. The third slit 106 extends from the upper end of each of the second supporting pieces 104 and reaches up to the upper surface of the bottom wall part 95. The second slit 106 is positioned at an intermediate position in the front-rear direction of each of the second supporting pieces 104.

As depicted in FIGS. 7 and 8, the lid part 74*b* has a shape of a flat plate which has a thickness in the up-down direction. The lid part 74*b* extends in the front-rear direction and the left-right direction. An upper surface and a lower surface of the lid part 74*b* have a rectangular shape which is longer in the left-right direction than in the front-rear direction. The lid part 74*b* faces the bottom wall part 95 in the up-down direction. The lid part 74*b* closes a space between the upper end 93*a* of the rear wall part 93 and the upper end 94*a* of the front wall part 94. Namely, the lid part 74*b* closes an opening of the body part 74*a*. The lid part 74*b* is fixed to the body part 74*a* by a plurality of screws 107 which are arranged in the left-right direction with a spacing distance therebetween. The lid part 74*b* is formed with a plurality of ribs 108 which extend from the lower surface of the lid part 74*b* in the down direction. The plurality of ribs 108 are arranged in the left-right direction, with a spacing distance therebetween. In the present embodiment, the plurality of ribs 108 includes two first ribs 108*a* of which forward end parts are formed to have a bifurcated shape so as to avoid the regulating piece 99, and six second ribs 108*b* of which thickness in the left-right direction is smaller than that of the first rib 108*a*.

As depicted in FIGS. 4 and 8, a length L3 in the up-down direction (an example of a "crossing direction") between an upper end 74*bb* of the lid part 74*b* and a lower end 95*a* of the bottom wall part 95 is longer than a length L4 in the up-down direction between an upper end 25*a* and a lower end 25*b* of the CIS 25. The upper end 74*bb* of the lid part 74*b* is positioned above the upper end 25*a* of the CIS 25. The lower end 95*a* of the bottom wall part 95 is positioned below the lower end 25*b* of the CIS 25.

The spurs 40B and the spur cleaners 105 are incorporated into the first spur holder 74. Each of the spurs 40B is in a state of being projecting (protruding) to the outside of the rear wall part 93, the bottom wall part 95 and the front wall part 94 via one of the plurality of slits 98, and the first rotating shaft 101 is rotatably supported by the two first supporting pieces 102 and the two second supporting pieces 104. The position of each of the spurs 40B is determined in the left-right direction by positioning both ends in the axial direction of the first rotating shaft 101 adjacent to the two regulating pieces 99 between which one of the plurality of first slits 98 is interposed.

A second rotating shaft 105*b* of each of the plurality of spur cleaners 105 is rotatably supported by the two supporting pieces 104. The position of each of the plurality of spur cleaners 105 is determined in the left-right direction by positioning end surfaces in the axial direction of the rotating part 105*a* adjacent to the two supporting pieces 104. By the lid part 74*b* being fixed to the body part 74*a* by the plurality of screws 107, the spurs 40B and the plurality of spur cleaners 105 are prevented, by the lid part 74*b*, from being detached or falling out from the inside of the first spur holder 74, and there is provided a state that forward end parts of the plurality of ribs 108 make contact with the first rotating shaft 101 of each of the spurs 40B from thereabove, thereby determining the position of the spurs 40B in the up-down direction.

As depicted in FIGS. 4 and 7, the second spur holder 75 is positioned in front of the first spur holder 74 at a spacing distance. The second spur holder 75 holds the spurs 72B. The second spur holder 75 has a configuration which is substantially similar to that of the first spur holder 74. Accordingly, in the second spur holder 75, a same reference numeral is affixed to an element corresponding to that in the first spur holder 74, and any overlapping explanation therefor will be omitted.

The first connecting member 76 has a shape of a flat plate which has a thickness in the up-down direction. The first connecting member 76 spreads in the front-rear direction and the left-right direction. An upper surface and a lower surface of the first connecting member 76 each have a rectangular shape which is longer in the front-rear direction than in the left-right direction. The first connecting member 76 connects a left end part of the first spur holder 74 and a left end part of the second spur holder 75. Specifically, the first connecting member 76 connects a front end edge of the bottom wall part 95 of the first spur holder 74 and a rear end edge of the bottom wall part 95 of the second spur holder 75.

The second connecting member 77 has a shape which is similar to that of the first connecting member 76. The second connecting member 77 connects a right end part of the first spur holder 74 and a right end part of the second spur holder 75. Specifically, the second connecting member 77 connects the front end edge of the bottom wall part 95 of the first spur holder 74 and the rear end edge of the bottom wall part 95 of the second spur holder 75.

The first fitting part 91 is arranged in the first spur holder 74. The first fitting part 91 is positioned in the rear surface of the rear wall part 93 of the first spur holder 74. The first fitting part 91 has a central fitting part 91*a* arranged in a central part in the left-right direction of the rear surface of the rear wall part 93 and both end fitting parts 91*b* arranged, respectively, in both end parts in the left-right direction of the rear surface of the rear wall part 93.

The central fitting part 91*a* has a first projecting part 111 which is arranged in the center in the left-right direction in the rear surface of the rear wall part 93, and two second projecting parts 112 each of which is arranged at a spacing distance, in the left-right direction, from the first projecting part 111 in the rear surface of the rear wall part 93. The first projecting part 111 extends in the rear direction from an upper end part of the rear surface of the rear wall part 93. The first projecting part 111 is formed to have a shape which is substantially of a letter "U" which is oriented in the down direction as seen from the front direction. Each of the two second projecting parts 112 extends, in the rear surface of the rear wall part 93, in the rear direction from a position below a lower end of the first projecting part 111. Each of the two second projecting parts 112 has a flat plate part 112*a* extending in the front-rear direction and the left-right direction, and circular arc parts 112*b* which are formed, respectively, in both edges in the left-right direction of the flat plate part 112*a*. The circular arc parts 112*b* are formed to have a circular arc shape along the outer circumferential surface of the first shaft 84. As depicted in FIG. 9, a spacing distance L1 between the lower end of the first projecting part 111 and the upper surface of the flat plate part 112*a* is slightly shorter than the diameter of the first shaft 84.

As depicted in FIG. 7, the both end fitting parts 91*b* have first fitting pieces 113 which are positioned, respectively, at both end edges in the left-right direction in the rear surface of the rear wall part 93, and second fitting pieces 114 each of which is positioned at a spacing distance in the left-right direction from one of the first fitting pieces 113. The first fitting pieces 113 extend in the rear direction from a lower end part of the rear surface of the rear wall part 93. Each of the first fitting pieces 113 extends in the front-rear direction and the up-down direction. An upper edge of each of the first fitting pieces 113 is formed to have a circular arc shape along the outer circumferential surface of the first shaft 84. The second fitting pieces 114 extend in the rear direction from the upper end part of the rear surface of the rear wall part 93. Each of the second fitting pieces 114 extends in the front-rear direction and the up-down direction. A lower edge of each of the second fitting pieces 114 is formed to have a circular arc shape along the outer circumferential surface of the first shaft 84. A spacing distance in the up-down direction between the upper edge of each of the first fitting pieces 113 and the lower edge of one of the second fitting pieces 114 is equal to the spacing distance L1 in the up-down direction between the lower end of the first projecting part 111 and the upper surface of the flat plate part 112*a*. Namely, the spacing distance in the up-down direction between the upper edge of each of the first fitting pieces 113 and the lower edge of one of the second fitting pieces 114 is slightly shorter than the diameter of the first shaft 84. Note that one of the both end fitting parts 91*b* and the central fitting part 91*a* may be omitted.

As depicted in FIGS. 7 and 10, the second fitting parts 92 are arranged in the second spur holder 75. The second fitting parts 92 are positioned in the front surface of the front wall part 94 of the second spur holder 75. The second fitting parts 92 are arranged, in a central part and in both end parts in the left-right direction in the front surface of the front wall part 94. Each of the second fitting parts 92 has a plurality of third fitting pieces 92*a*, a connecting piece 92*b* and a third projecting part 92*c*.

The plurality of third fitting pieces 92*a* are formed in the front surface of the front wall part 94 with a spacing distance therebetween in the left-right direction. The plurality of third fitting pieces 92*a* extend in the front direction from the front surface of the front wall part 94. The plurality of third fitting pieces 92*a* extend in the front-rear direction and the up-down direction. An upper edge of each of the plurality of third fitting pieces 92*a* is formed to have a shape which is substantially of a letter "U" as seen from the left-right direction (see FIG. 9). The connecting piece 92*b* connects front end edges of third fitting pieces 92*a* which are adjacent to each other in the left-right direction. Each of the plurality of third projecting parts 92*c* projects in the front direction from the upper part of the front surface of the front wall part 94. Each of the plurality of third projecting parts 92*c* is positioned between the third fitting pieces 92*a* which are adjacent to each other in the left-right direction. As depicted in FIG. 9, a spacing distance L2 in the front-rear direction between a front end edge of the third fitting part 92*c* and the upper edge of the third fitting piece 92*a* is slightly shorter than the diameter of the second shaft 85.

Note that although each of the second fitting parts 92 at the both ends has two piece of the third fitting piece 92*a* and the second fitting part 92 at the central part has four pieces of the third fitting piece 92*a*, it is allowable that each of the second fitting parts has not less than 1 (one) piece of the third fitting piece 92*a*. Further, it is allowable to omit one of the second fitting part 92 at the central part and the second fitting parts 92 at the both end parts.

The holding member 73 configured as described above is attached and detached with respect to the supporting frame 83 via the first shaft 84 and the second shaft 85, in the following manner.

First, the user fits the first shaft 84 to the first fitting part 91. Specifically, the user fits the first shaft 84 to the central fitting part 91*a* against an elastic force of each of the first projecting part 111 and the two second projecting parts 112, and fits the first shaft 84 to the both end fitting parts 91*b* against an elastic force of each of the first projecting pieces 113 and the second projecting pieces 114.

Next, the user fits the second shaft 85 to the second fitting parts 92. Specifically, first, the user rotates the holding member 73 in the up direction up to a position at which the holding member 73 approaches closely to the second shaft 85, with the first shaft 84 fitted to the first fitting part 91 as the center of rotation. Next, the user fits the second shaft 85 to the second fitting parts 92 against the elastic force of each of the plurality of third projecting parts 92*c* and the plurality of third fitting pieces 92*a*. With this, there is provided a state that the plurality of third projecting parts 92*c* make contact with the upper side of the second shaft 85, thereby preventing the occurrence of such a situation that the second shaft 85 is detached from the second fitting parts 92 in the up direction. In such a manner, the holding member 73 is attached to the supporting frame 83 via the first shaft 84 and the second shaft 85.

On the other hand, for example, in a case that the holding member 73 is to be detached from the first shaft 84 and the second shaft 85 in order to exchange the spur cleaners 105, the detaching is performed in a reverse procedure to that as described above. The user detaches the holding member 73 from the first shaft 84 and the second shaft 85, and then the user detaches the lid part 74*b* of each of the first spur holder 74 and the second spur holder 75 from the body part 74*a*, thereby making it possible to easily exchange the spur cleaners 105.

Next, an operation of the image recording apparatus 10 will be explained.

In a case that the conveying roller 36A of the conveying roller pair 36 rotates, the sheet S is drawn in the up direction from the roll body 37 in the sheet accommodating space 30C, via the gap 42. The sheet S drawn from the roll body 37 is conveyed in the front direction while being nipped between the conveying roller 36A and the pinch roller 36B. The sheet S conveyed in the front direction by the conveying roller pair 36 is supported by the supporting part 118 of the supporting mechanism 116. In this situation, the ink is discharged downward from the plurality of nozzles 38A of the recording head 38 to thereby record an image on the upper surface of the sheet S. The sheet S having the image recorded on the upper surface thereof is conveyed in the front direction by the conveying belt 117.

The sheet S which is (being) conveyed in the front direction by the conveying belt 117 is supported by the upper surface of the metallic plate 39*a* of the fixing part 39. While the sheet S is passing on the metallic plate 39*a*, the sheet S and the ink are heated by the heat of the metallic plate 39*a*. With this, the thermoplastic resin fine particles included in the ink are melted, and then are subjected to cooling thereafter to thereby cure or harden the molten thermoplastic resin fine particles, thereby fixing the pigment included in the ink to the sheet S. In this situation, a part of the heat of the metallic plate 39*a* is radiated toward the CIS 25, but the first spur holder 74 positioned between the CIS 25 and the fixing part 39 functions as a heat shielding wall. Accordingly, the heat of the metallic plate 39*a* is less likely to be transmitted to the CIS 25.

The sheet S heated in the fixing part 39 is conveyed in the front direction while being nipped between the discharging roller 40A and the spurs 40B of the first discharging roller pair 40. In this situation, the ink adhered to the spurs 40B is removed by the plurality of spur cleaners 105 making contact with the spurs 40B, respectively, and rotating following the rotation of the spurs 40B. The sheet S which is (being) conveyed in the front direction by the first discharging roller pair 40 is supported by the supporting member 46. In a case that the sheet S is supported by the supporting member 46, the CIS 25 radiates the light from the light source toward the upper surface (recording surface) of the sheet S, and outputs an electric signal in accordance with the intensity of a reflected light of the light reflected off (by) the sheet S. With this, the image of the upper surface (recording surface) of the sheet S is read by the CIS 25.

The sheet S of which image has been read by the CIS 25 is conveyed in the front direction by the second discharging roller pair 72. The sheet S which is conveyed in the front direction by the second discharging roller pair 72 is cut along the left-right direction by the cutter unit 26 in a state that a front part of the sheet S is exposed from the discharge port 33 to the outside of the casing 30. The sheet S cut by the cutter unit 26 is discharged from the discharge port 33.

Effect of Embodiment

In the image recording apparatus 10, since the both ends in the up-down direction of the first spur holder 74 are positioned at the outside of the both ends in the up-down direction of the CIS 25, the first spur holder 74 is likely to function as the heat shielding wall with respect to the radiation heat of the fixing part 39. Accordingly, the radiation heat of the fixing part 39 is less likely to reach the CIS 25, thereby making it possible to sufficiently suppress the occurrence of any unsatisfactory reading by the CIS 25.

In the image recording apparatus 10, since the two walls, which are the rear wall part 93 and the front wall part 94 of the first spur holder 74 function as the heat shielding wall with respect to the radiation heat of the fixing part 39, the radiation heat of the fixing part 39 is less likely to reach the CIS 25.

In the image recording apparatus 10, since the rear wall part 93 and the front wall part 94 of the first spur holder 74 extend in the left-right direction, the rear wall part 93 and the front wall part 94 of the first spur holder 74 are likely to function as the heat shielding wall with respect to the radiation heat of the fixing part 39. Accordingly, the radiation heat of the fixing part 39 is less likely to reach the CIS 25.

In the image recording apparatus 10, since an air layer (air cavity) surrounded by the rear wall part 93, the front wall part 94, the bottom wall part 95 and the lid part 74*b* is formed or defined in the first spur holder 74, the radiation heat of the fixing part 39 is less likely to be transmitted to the first spur holder 74. Accordingly, since the first spur holder 74 is likely to function as the heat shielding wall with respect to the radiation heat of the fixing part 39, the radiation heat of the fixing part 39 is less likely to reach the CIS 25.

In the image recording apparatus 10, since a part of each of the spurs 40B protrudes to the outside of the bottom wall part 95 via one of the plurality of first slits 98 formed in the bottom wall part 95, it is possible, in the first spur holder 74, to cause the spurs 40B to make contact with the recording surface (upper surface) of the sheet S, while retaining the air layer which is surrounded by the rear wall part 93, the front wall part 94, the bottom wall part 95 and the lid part 74*b* in the first spur holder 74.

In the image recording apparatus 10, since the plurality of spur cleaners 105 which make contact, respectively, with the spurs 40B are positioned between the rear wall part 93 and the front wall part 94 of the first spur holder 74, it is possible to remove the ink adhered to the spurs 40B by the plurality of spur cleaners 105.

In the image recording apparatus 10, since the user is capable of detaching the first spur holder 74 from the supporting frame 83 via the first shaft 84, it is possible to easily exchange the spur cleaners 105.

In the image recording apparatus 10, since the both ends in the left-right direction, 56 of the rear wall part 93 of the first spur holder 74 are positioned at the outside, respectively, of the both ends in the left-right direction of the fixing part 39, the rear wall part 93 of the first spur holder 74 is likely to function as the heat shielding wall with respect to the radiation heat of the fixing part 39. Accordingly, the radiation heat of the fixing part 39 is less likely to reach the CIS 25.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below.

[Modification]

In the image recording apparatus 10, although the fixing part 39 which is configured to fix the ink to the sheet S heats the sheet S and the ink, it is sufficient that the fixing part 39 heats at least one of the ink and the sheet S (that is, the ink and/or the sheet S). In such a case, it is allowable, for example, that the fixing part is configured to heat the sheet S in advance, and to cause the ink to fix to the sheet S by the residual heat of the pre-heating.

In the image recording apparatus 10, although the first spur holder 74 and the second spurt holder 75 are connected to each other by the first connecting member 76 and the second connecting member 77, it is allowable that the first spur holder 74 and the second spurt holder 75 are not connected to each other. Namely, it is allowable that the first spur holder 74 and the second spurt holder 75 are separated from each other.

In the image recording apparatus 10, although the first spur holder 74 and the second spurt holder 75 are configured to be detachably attachable, via the first shaft 84 and the second shaft 85, with respect to the supporting frame 83 which is fixed to the inner wall surface of the upper casing 31, it is allowable that the first spur holder 74 and the second spurt holder 75 are configured to be detachably attachable with respect to the side frames 20, 21 which are fixed to the lower casing 32. In such a case, the first shaft 84 and the second shaft 85 are fixed to the side frames 20, 21.

In the above-described embodiment, it is allowable to use a CCD camera, instead of using the CIS 25. The CCD camera is another example of the "reader".

What is claimed is:

1. An image recording apparatus comprising:

a conveyer configured to convey a sheet in a conveying direction;

a head configured to discharge a liquid toward the sheet;

a heater configured to heat the sheet and/or the liquid on the sheet;

a reader positioned downstream in the conveying direction of the heater, the reader being configured to read an image, on the sheet, formed by the head and the heater; and a holder positioned between the reader and the heater in the conveying direction, the holder being configured to hold a body of rotation configured to contact a recording surface of the sheet, wherein in a crossing direction orthogonal to the conveying direction and crossing the recording surface of the sheet being conveyed by the conveyer, both ends in the crossing direction of the holder are positioned outside of both ends in the crossing direction of the reader.

2. The image recording apparatus according to claim 1, wherein the holder includes a first wall positioned upstream in the conveying direction of a rotation axis of the body of rotation and extending in the crossing direction, and a second wall positioned downstream in the conveying direction of the rotation axis of the body of rotation and extending in the crossing direction.

3. The image recording apparatus according to claim 2, wherein the first wall and the second wall extend in a first direction crossing the conveying direction and crossing the crossing direction.

4. The image recording apparatus according to claim 3, wherein the holder further includes a third wall closing a space between a first end in the crossing direction of the first wall and a first end in the crossing direction of the second wall, and a fourth wall closing a space between a second end in the crossing direction of the first wall and a second end in the crossing direction of the second wall.

5. The image recording apparatus according to claim 4, wherein a slit is formed in the third wall; and a part of the body of rotation protrudes to outside of the third wall via the slit.

6. The image recording apparatus according to claim 5, wherein a cleaner configured to make contact with the body of rotation is positioned between the first wall and the second wall.

7. The image recording apparatus according to claim 6, wherein the cleaner is aligned with the body of rotation in the crossing direction.

8. The image recording apparatus according to claim 1, further comprising a frame configured to support the holder, wherein the holder is detachably attached with respect to the frame.

9. The image recording apparatus according to claim 3, wherein both ends in the first direction of the first wall are positioned outside, respectively, of both ends in the first direction of the heater.

* * * * *